United States Patent [19]

Telfair et al.

[11] Patent Number: 4,885,471
[45] Date of Patent: Dec. 5, 1989

[54] ULTRAVIOLET RADIOMETER

[75] Inventors: William B. Telfair, Newtown; Clifford A. Martin, Bridgeport, both of Conn.; Eugene I. Gordon, Pacific Palisades, Calif.; William C. Fricke, New Fairfield, Conn.

[73] Assignee: Taunton Technologies, Inc., Monroe, Conn.

[21] Appl. No.: 185,867

[22] Filed: Apr. 22, 1988

[51] Int. Cl.⁴ .............................................. G01J 1/58
[52] U.S. Cl. ........................... 250/461.1; 250/365; 250/372
[58] Field of Search .................... 250/461.1, 372, 365

[56] References Cited

U.S. PATENT DOCUMENTS

| | | | |
|---|---|---|---|
| 3,569,102 | 4/1972 | Toriyama | 250/458.1 |
| 3,764,214 | 10/1973 | Heiss | 356/201 |
| 3,838,282 | 9/1974 | Harris | 250/372 |
| 4,015,130 | 3/1977 | Landry et al. | 250/372 |
| 4,061,922 | 12/1977 | Last | 250/461.1 |
| 4,096,387 | 6/1978 | Buckley | 250/372 |
| 4,272,679 | 6/1981 | Blades | 250/372 |
| 4,302,678 | 11/1981 | Schiffert | 250/461.1 |
| 4,403,826 | 9/1983 | Presby | 350/96.30 |
| 4,629,896 | 12/1986 | Bridgen | 250/372 |
| 4,665,913 | 5/1987 | L'Esperance, Jr. | 128/303.1 |
| 4,669,466 | 6/1987 | L'Esperance | 128/303.1 |
| 4,704,030 | 11/1987 | Steen et al. | 356/121 |
| 4,718,418 | 1/1988 | L'Esperance, Jr. | 128/303.1 |
| 4,721,379 | 1/1988 | L'Esperance | 351/212 |
| 4,731,881 | 3/1988 | Geller | 455/619 |

FOREIGN PATENT DOCUMENTS 338978 7/1959 Switzerland ............. 250/461.1
2200987 8/1988 United Kingdom ........ 250/365

OTHER PUBLICATIONS

Robertson, J. M., "Cathodoluminescent Garnet Layers", *Thin Solid Films*, 114, (1984), pp. 221-240.

Primary Examiner—Constantine Hannaher
Attorney, Agent, or Firm—Kramer, Brufsky & Cifelli

[57] ABSTRACT

An ultraviolet radiometer converts UV radiation to fluorescent radiation. An optical signal corresponding to the intensity of detected fluorescent radiation is converted to an electrical signal corresponding to the power or energy of the detected fluorescent emission. A monitoring element receives the electrical signal and monitors the power or energy of the UV radiation.

22 Claims, 3 Drawing Sheets

ULTRAVIOLET RADIOMETER

This application relates to U.S. patent application Ser. No. 185,152, entitled "BEAM INTENSITY PROFILIMETER", by Telfair et al., filed Apr. 22, 1988.

While the invention is subject to a wide range of applications, it is particularly suited for measuring the intensity of ultraviolet (UV) radiation and will be particularly described in that connection. More particularly, a beam of ultraviolet radiation is incident upon a material which emits visible fluorescent radiation. The power of the fluorescent radiation is linearly proportional to the power of the ultraviolet radiation and can be measured to determine the UV power level and/or energy level.

In the past, a number of techniques have been employed to measure the power or energy of a UV source such as a laser. Examples of these techniques are disclosed in U.S. Pat. Nos. 3,764,214; 4,015,130; 4,061,922; 4,096,387; 4,704,030; 4,272,679; 4,302,678; 4,403,826 and 4,629,896. However, these patents do not disclose a measuring system incorporating a material which fluoresces when impinged by a beam of UV radiation, is optically transparent to fluorescent wavelengths, produces a fluorescent emission beam whose response is relatively linear over a wide range of UV wavelengths, and has a high damage threshold.

A material which has been found to be particularly useful in converting invisible UV radiation to visible fluorescent radiation is a rare earth doped garnet, $Ce^{3+}:Y_3 Al_5 O_{12}$ (YAG). The ability of this material to fluoresce is described in an article entitled "CATHODOLUMINESCENT GARNET LAYERS", by J. M. Robertson, *Thin Solid Films*, 114 (1984) 221-240. The article, however, does not disclose the concept of measuring a high powered UV laser beam with an instrument incorporating the doped YAG material.

It is a problem underlying the present invention to easily, quickly and accurately determine the power or energy of a beam of high power UV radiation without damaging the material used to intercept the beam of UV radiation.

It is an advantage of the present invention to provide an ultraviolet radiometer which obviates one or more of the limitations and disadvantages of the described prior arrangements.

It is a further advantage of the present invention to provide an ultraviolet radiometer which determines the power and/or energy of a beam of UV radiation.

It is a yet further advantage of the present invention to provide an ultraviolet radiometer which has a very short response time.

It is a still further advantage of the present invention to provide an ultraviolet radiometer including a device for converting UV radiation to fluorescent radiation wherein the fluorescent emission is substantially linearly proportional to the incident UV radiation over a wide range of incident wave lengths.

It is still another advantage of the present invention to provide an ultraviolet radiometer which is relatively inexpensive to manufacture and easy to operate.

Accordingly, there has been provided an ultraviolet radiometer which includes a plate that emits an amount of visible fluorescent radiation which is linearly proportional to the power and/or energy of a UV beam striking the plate. A component converts the optical signal corresponding to the visible fluorescent radiation to an electrical signal. The converting component is operatively connected to a monitoring device which translates and displays the electrical signal as a value indicative of either the power or the energy of the UV emission.

The invention and further developments of the invention are now elucidated by means of preferred embodiments shown in the drawings.

DETAILED DESCRIPTION OF THE PREFERRED EMBODIMENT

Figure 1:
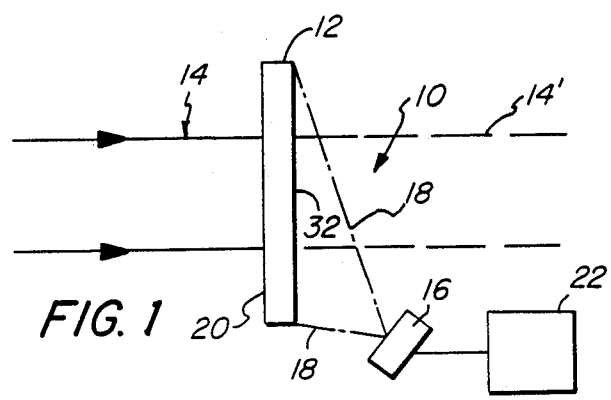
FIG. 1 is an illustration of an ultraviolet radiometer in accordance with the present invention.
Figure 1A:
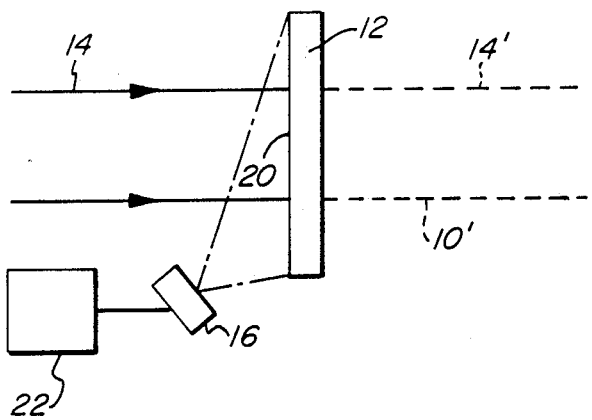
FIG. 1A is an illustration of an ultraviolet radiometer wherein the fluorescent emission is detected from the side of the plate on which the UV radiation is incident.

Referring to FIG. 1, there is illustrated a schematic of an ultraviolet radiometer 10. The radiometer 10 includes a fluorescing screen or plate 12 which linearly converts the intensity of an incident UV beam 14 into visible fluorescent light. Disposed behind the plate 12 or in front of plate 12, see FIG. 1A, is a conventional converter 16 which converts an optical signal corresponding to the fluorescent light collected from the plate 12 to an electrical signal. The optical signal corresponds to the fluorescent light collected from the cone of incidence 18. Although the fluorescing light is emanating in all directions from the plate 12, see FIG. 3, the plate 12 is selected so that the light detected by component 16 is proportional to the incident UV radiation which impinges on the front face 20 of the plate 12. The position of the detector 16 is preferably offset from the axis of the plate in order to prevent any UV radiation transmitted through the plate 12 from damaging the detector. The detector 16 is a conventional photodetector such as a silicon photodetector sold by United Detector Technology of Hawthorne, Calif.

The detector component 16 is electrically connected to a meter 22 which displays and/or records the power or energy of the fluorescent light emission. Meter 22 is preferably calibrated to directly display the power or energy of the incident UV radiation 14. The calibration is easily accomplished since the fluorescent emission is substantially linearly proportional over a wide range of UV radiation power levels. The component 22 can be a conventional device such as an amp or volt meter with appropriate circuitry. Also, a video device, not shown, may be connected to, combined with or provided as a replacement for components 16 and 22 so as to provide a visual display of the intensity profile of the ultraviolet and/or fluorescent radiation. This concept is more fully described in U.S. patent application Ser. No. 185,152, entitled "Beam Intensity Profilometer", by Telfair et al.

Although the present invention is relevant to any UV radiation, it is particularly designed to measure power (Joules per second) or energy (Joules) of high power UV laser beams. Therefore, this radiometer 10 would be either a radiometer for measuring power or a joulemeter for measuring energy. The power of an excimer laser having a wavelength of 193 mm has been successfully measured by an instrument constructed in accordance with the principles of the present invention.

The instrument, herein identified as the ultraviolet radiometer 10, is based on the principle that the fluorescent emission of certain materials used in constructing plate 12 is linearly proportional to the incident UV power or energy over many orders of magnitude. The fluorescing atoms in the plate 12 absorb the incident UV radiation and are raised to an excited energy state. A very short time later these excited atoms decay, producing among other things, fluorescent emission. The fluorescent emission can be collected and converted to an electrical signal, which when calibrated, correlates to the UV beam. An observer can now "see" the UV radiation beam and determine the energy or power of the beam.

The plate 12 is constructed of a class of materials which are optically transparent to fluorescent wavelengths. For the purposes of the present invention, an optically transparent material is defined as one which transmits a sufficient amount of the fluorescence through the material to produce a usable optical signal, i.e. a signal which can be measured by a photodetector. This is a critical characteristic because the fluorescent radiation, resulting from the incidence of UV on the plate, must be able to be emitted from the plate in order for the amount of fluorescent radiation to be ascertained. The plate 12 is preferably opaque to UV radiation. Normally, the UV radiation, most commonly a laser beam, will be partially transmitted through the plate.

Other important characteristics of the plate include the ability to withstand high fluence, i.e. the energy density of the UV laser incident on the plate, which is indicative of a high damage threshold. The plate should have a high signal/noise ratio, i.e. a good conversion efficiency. That is, for an amount of UV radiation which is incident on the plate, a high amount of fluorescent radiation is given off. In the case of a $Ce^{3+}$:YAG and an excimer laser, an approximate 25% conversion efficiency is achieved at 193 mm. Moreover, it is important that the amount of fluorescence for a given amount of UV radiation is very repeatable.

The fluorescing screen or plate 12 is constructed of a fluorescent material selected from the group consisting essentially of rare earth doped glasses, fluorescent mediums suspended in plastic, undoped crystals (e.g., sapphire) and rare earth doped crystals. Preferably, the material is a fluorescent crystalline material because of their higher damage thresholds.

In the preferred embodiment, the fluorescent material is a rare earth doped crystal such as a rare earth doped garnet like $Ce^{3+}$:$Y_3 Al_5 O_{12}$ (YAG). Besides cerium (Ce), other rare earth elements suitable for doping include neodymium (Nd), lanthanum (La) and Europium (Eu). However, it is within the terms of the present invention to dope the crystal with any suitable rare earth.

The fluorescent material can also comprise rare earth doped glasses. Any glass, such as a borosilicate glass, doped with any of the rare earth materials including Ce, Nd, Eu and La, are thought to be useful.

The fluorescent material can also be suspended in plastic. For example, a rare earth doped crystal, a rare earth doped glass or an undoped crystal could be pulverized and suspended in a plastic. Another possibility is to modify a plastic by either doping or chemically adding a dye or a rare earth element to a plastic.

Figure 3:
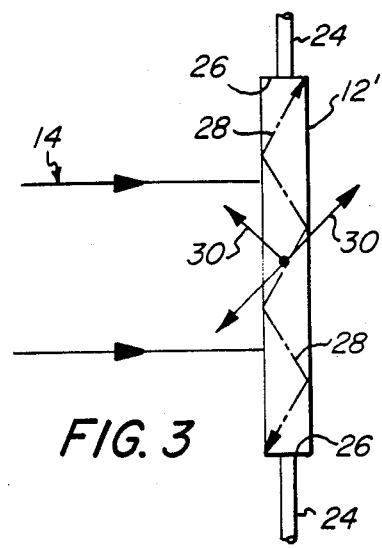
FIG. 3 is an illustration of a UV to fluorescent emission converting plate wherein fluorescent emissions having an angle of about 38 to about 90 degrees are piped to the edge of the plate.

Plate 12 is selected to have a high index of refraction (n). A high index of refraction results in a high percentage of the emitted fluoresence being trapped by total internal reflection and piped to the edges of the plate as shown in FIG. 3. Referring to FIG. 3, there is illustrated a schematic view of a plate 12' with fiber optics 24 attached to the edge emission surfaces 26 of the plate. Primed and double primed reference numbers indicate components which are substantially the same as components designated by unprimed reference numerals. The plate is selected with as high an index of refraction as possible. Concurrently, most plates have an index of refraction of about 1.6 to about 1.9 and most typically about 1.7. The angle of incidence determines whether the fluorescent light wave is trapped by the total internal reflection and piped to the edge of the plate, i.e. like light wave 28 or transmitted out of the plate, as with light wave 30. The following formula defines the angles of incidence, $\theta_{TIR}$ that are totally internally reflected:

$$\theta_{TIR} > \text{arc SIN } (1/n_\lambda)$$

where TIR stands for total internal reflection, and $n_\lambda$ is the index of refraction at the wavelength $\lambda$.

For a $Ce^{3+}$:YAG plate, all rays incident at angles greater than about 38° are totally internally reflected.

The configuration of the components which comprise the instrument 10 are important aspects of the present invention. The fluorescing light can be collected directly with a detector 16, as illustrated in FIG. 1. The detector 16 is preferably out of the way of laser UV radiation 14' which would project at about a 90° angle with respect to the back surface 32 of plate 12. As shown, the detector 16 is outside the plane formed by projecting the edge surface of the plate 90° from the surface 32. This positioning is advantageous and possibly necessary to prevent damage to component 16 from the UV laser beams which are transmitted through plate 12.

Figure 2:
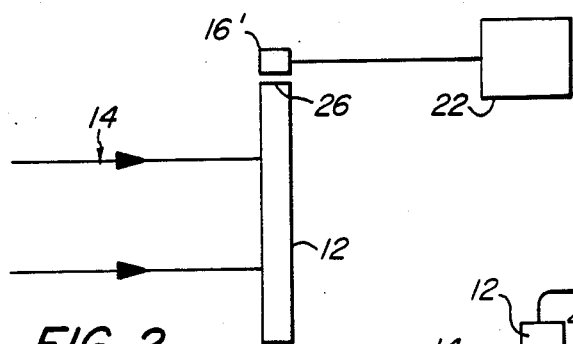
FIG. 2 is an illustration of a second embodiment of the ultraviolet radiometer of the present invention.

A second embodiment is illustrated in FIG. 2, where one or more detectors 16' are disposed adjacent the edge emission surface 26 of plate 12 to convert the trapped fluorescing light to an electrical signal for transmission to meter 22.

Figure 2A:
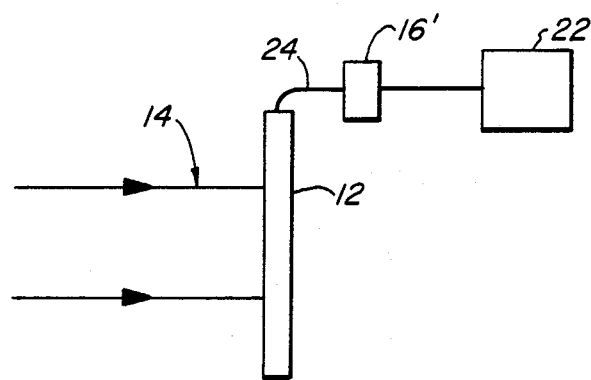
FIG. 2A is an illustration of a third embodiment of the ultraviolet radiometer of the present invention.

A third embodiment of the present invention, as illustrated in FIG. 2A provides one optical fiber 24 disposed adjacent to the edge emission surface 26 of plate 12 to transfer the trapped fluorescing light to the detector 16'.

Figure 4:
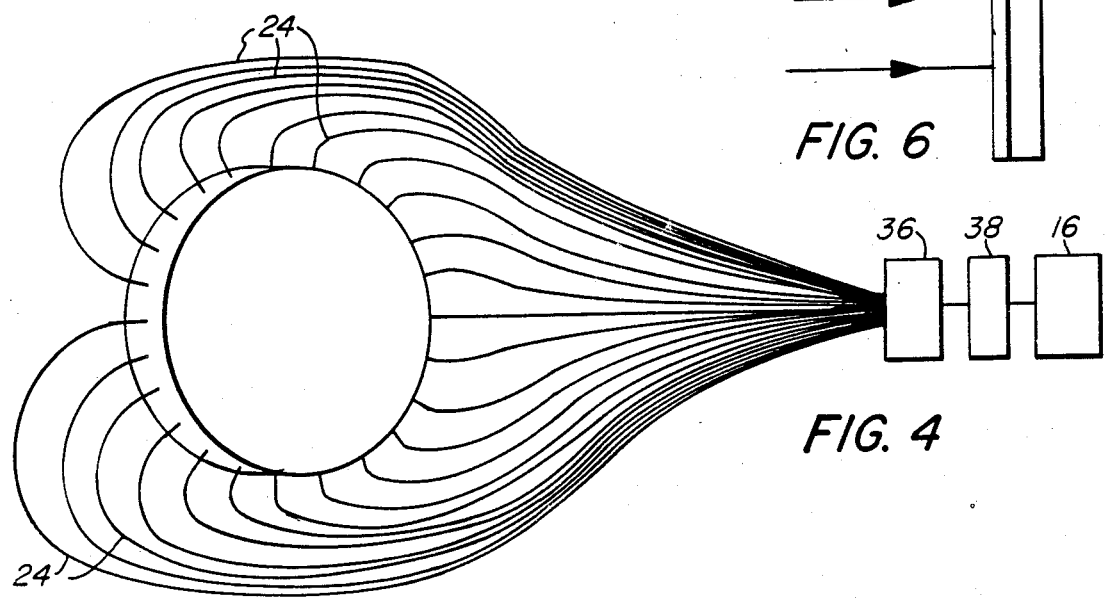
FIG. 4 is an illustration of a fourth embodiment of the present invention wherein fiber optic strands are disposed about the edge of the fluorescing converting plate for transmitting fluorescent emission to the component for converting the optical signal from the fluorescent emission to an electrical signal.

Referring to FIG. 4, there is illustrated a fourth embodiment wherein multiple optical fibers 24 are spaced around the emission edge surface 26 of plate 12. For a high sensitivity device, the high number o optical fibers provide a highly uniform a real response due to the averaging effect of the multiple fibers and to the trapping characteristics of the plate. In fact, the closer the spacing, the higher the uniform response. This is more important for small UV beams. This effect can be understood from the following principles. If a small diameter UV laser beam is incident on the plate near an optical fiber, there is produced a large optical signal at the fiber. However, if the incident UV laser beam is far from the optical fiber, a small signal is produced at the fiber. The response is improved as more fibers are attached to the edge and a high a real uniformity can be achieved.

As illustrated in FIG. 4, an attenuator 36 can be provided in the path of the optical fibers to decrease the amount of light going into the optical-to-electrical converter 16. The reduction of light may be necessary if too much light is being generated by the fluorescence. Moreover, the use of the attenuator 36 can increase the dynamic range of the meter.

A band pass filter 38 may also be inserted in the path of the optical fibers with or without the attenuator 36. The band pass filter would preferably have a narrow spectrum of response to provide a more linear response over a wider range of intensities.

Figure 5:
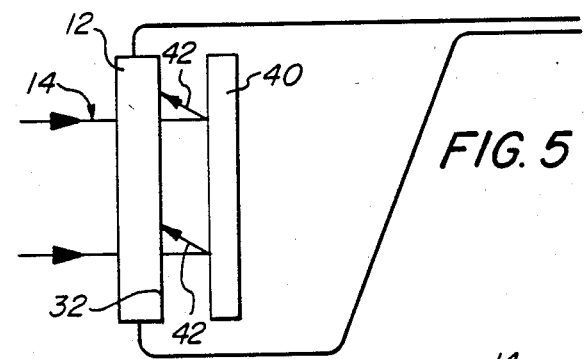
FIG. 5 is a fifth embodiment of the present invention wherein a device is provided behind a fluorescing plate to reflect UV radiation back into the fluorescing converting plate.

A fifth embodiment of the present invention is illustrated in FIG. 5 wherein a reflector 40 for reflecting the transmitted UV radiation 42 back into the fluorescing plate 12 is disposed facing side 32 of plate 12. The reflector can be connected to the plate 12 by any conventional means, if desired. The reflected UV radiation increases the fluorescent emission and thereby increases the sensitivity of the ultraviolet radiometer 10. The reflector 40 can be formed of any material such as, for example, a metal or multilayer dielectric. If desired, the multilayered dielectric can be coated onto the surface 32 of plate 12.

Figure 6:
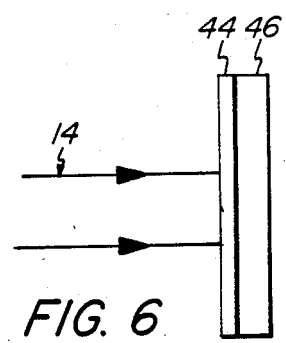
FIG. 6 is a sixth embodiment of the present invention wherein a fluorescing plate has a heat sink bonded to one side.

Referring to FIG. 6, a fluorescing plate 44 is illustrated with a heat sink 46 bonded to the side opposite from where the UV impinges the plate. The surface of the fluorescent plate bonded to the heat sink is preferably coated with a reflecting layer. The fluorescent plate 44, which is substantially the same as plate 12, is preferably thin so that a high incident UV power level, causing heating of the plate, will rapidly dissipate the heat into the heat sink and prevent rapid deterioration or destruction of the plate. The heat sink is preferably bonded to the rear surface of the plate having the reflector layer by any conventional thermal bonding material. The heat sink is preferably constructed from material having a coefficient of thermal expansion which is compatible with the plate 44 and/or the bonding material such as for example a stainless steel. The heat sink can also be bonded to plates 12 and 12' described hereinbefore. If desired, the rear surface can be reflection coated before bonding with a heat sink.

Figure 7:
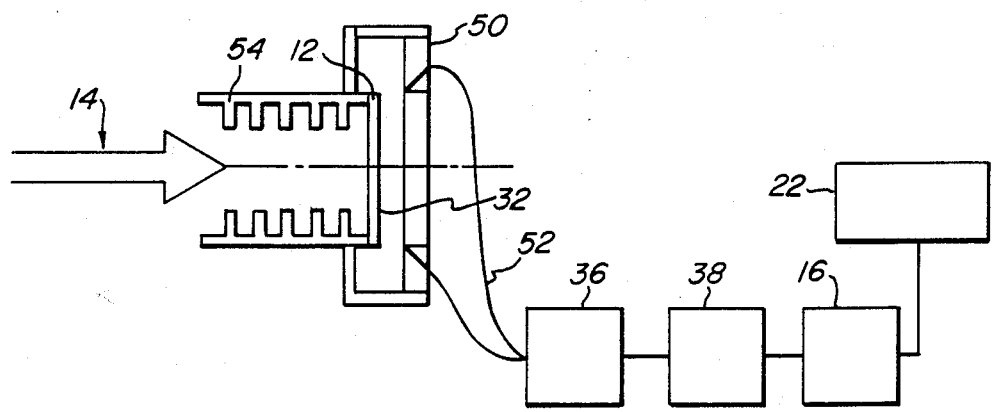
FIG. 7 is a schematic illustration of a seventh embodiment of the present invention wherein strands of optical fibers are disposed to collect fluorescent light transmitted through the front and/or rear surface(s) of the fluorescing converting plate.

Referring to FIG. 7, there is illustrated a sixth embodiment of the present invention in which a ring 50 supporting a plurality of fiber optic strands 52 is disposed facing the rear surface 32 of plate 12. These can also face the front surface. The plate 12 can be supported at the end of a conventional light baffle 54, more fully described in the U.S. patent application Ser. No. 185,152, entitled "Beam Intensity Profilometer", by Telfair et al.

The ring 50 can support any number of optical fibers in order to collect a uniform distribution of the fluorescent light emitted from surface 32. Moreover, the angular position of the fiber ends are preferably positioned to give a uniform response from any location on surface 32.

The fibers 52 can be connected to an optical attenuator 36 as described with reference to the fourth embodiment illustrated in FIG. 4. In addition, an optical band pass filter 38 can be inserted in the path of the fibers with or without the attenuator. The fibers 52 can then be attached to an electrical to optical converter 16. The electrical signal from the converter 16 can then be transmitted to a meter 22 as described hereinbefore.

Figure 8:
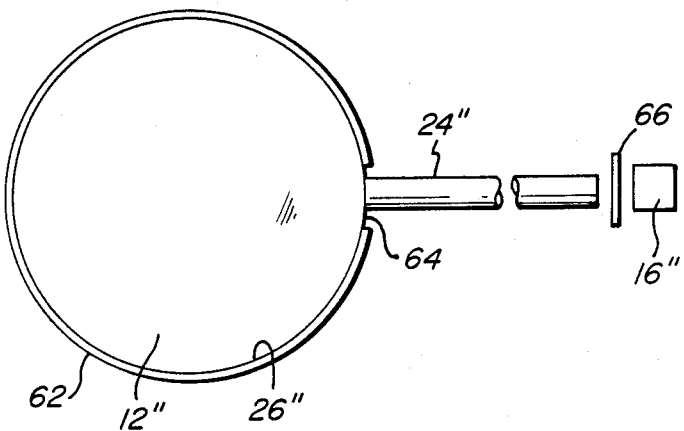
FIG. 8 is a schematic illustration of an eighth embodiment of the present invention wherein fluorescent radiation escaping from only a small portion of the fluorescing plate edge is detected with fiber optics.

FIG. 8 is a schematic illustration of an eighth embodiment of the present invention wherein the edge 26" of the fluorescing plate 12" has been polished and coated with a material 62, such as a metal or multilayer dielectric, that reflects all fluorescent radiation back into the plate 12". A small uncoated gap or space 64 is provided to enable fluorescent radiation to escape from the plate and, therefore, be detected using one or more fibers 24". The affect of the reflecting coating 62 is to allow the fluorescent radiation to only exit the plate 12" through the gap 64 in the reflecting coating. Since substantially all the fluorescence is funneled through the coating gap 64, the device responsivity is increased accordingly without the need for many fibers. This provides not only more signal, but also mixes the signal much more uniformly and hence is less sensitive to spatial location of the laser beam. Also, a conventional filter 66 can be disposed between the fiber. Although a single gap is illustrated, it is within the terms of the present invention to provide two or more gaps 64.

Figure 8A:
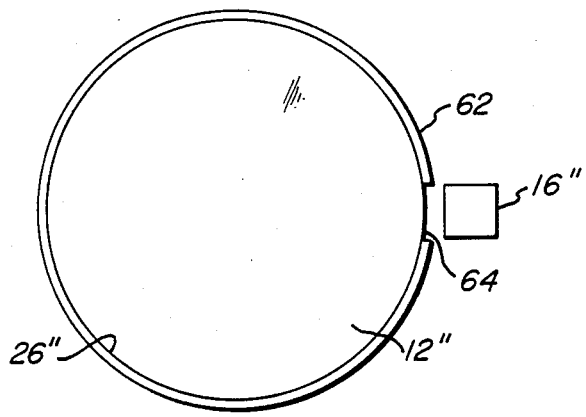
FIG. 8A is similar to the embodiment of FIG. 8 except the fluorescent emission is detected by a detector.

FIG. 8A is substantially the same as the embodiment illustrated in FIG. 8 except that the one or more fibers are replaced with one or more detectors 16". Moreover, a filter (not shown) can be disposed between the plate 12" and the detector 16", as required.

In operation, an instantaneous determination of the intensity of a two dimensional ultraviolet beam can be ascertained with the meter 10. The meter is first calibrated by a conventional means such as a National Bureau of Standards (NBS) calorimeter using the NBS procedure. The calibration enables the electrical signal corresponding to the fluorescing radiation to be a direct indication of the power or energy of the UV laser aimed at plate 12. An ultraviolet beam 14, preferably a laser beam, is first aimed onto a plate 12. The plate will then fluoresce and the optical signal will be detected by an optical detector either directly or through optical fibers attached to the edge surface of the plate.

Next, the detector 16 converts the optical signal corresponding to the detected fluorescence to an electrical signal. This electrical signal can then be transmitted to a meter 22 which indicates by an analog or digital display the power or energy of ultraviolet beam 14. While the detector 16 and 16' are described as being disposed behind the plate 12 from where UV beam is incident or adjacent the edge surface of plate 12, it is also within the terms of the present invention to dispose a detector adjacent to the surface of the plate 12 on which the UV beam is incident.

While the plate 12 is illustrated as being circular, it is within the terms of the present invention to shape it in any desired configuration, such as square or rectangular.

The patent application and patents set forth in this specification are intended to be incorporated in their entireties by reference herein.

It is apparent that there has been provided in accordance with this invention an ultraviolet radiometer and method of using the meter which satisfies the objects, means and advantages set forth hereinbefore. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An ultraviolet radiometer, comprising:
   means for converting incident UV radiation to fluorescent radiation, said UV radiation converting means being a plate constructed of fluorescent optically transparent material selected from undoped crystal, said undoped crystal being a sapphire;
   means for detecting the fluorescent radiation, the detecting means including means for converting the optical signal corresponding to the power of detected fluorescent emission radiation to an electrical signal; and
   means operatively connected with said detecting means to translate the electrical signal to indicate the power or energy of the UV radiation.

2. The ultraviolet radiometer of claim 1 wherein the fluorescent emission of said plate is linearly proportional to the incident UV power or energy.

3. An ultraviolet radiometer, comprising:
   means for converting incident UV radiation to fluorescent radiation, said UV radiation converting means being a plate constructed of fluorescent optically transparent material selected from the group consisting essentially of rare earth doped crystals, rare earth doped glasses, undoped crystals and fluorescent mediums suspended in plastic;
   means for detecting the fluorescent radiation, said detecting means including means for converting the optical signal corresponding to the power of detected fluorescent emission radiation to an electrical signal, the detecting means being disposed adjacent the side of the converting means to which UV radiation is incident; and
   means operatively connected with said detecting means to translate the electrical signal to indicate the power or energy of the UV radiation.

4. An ultraviolet radiometer, comprising:
   means for converting incident UV radiation to fluorescent radiation, said UV radiation converting means being a plate constructed of fluorescent optically transparent material selected from the group consisting essentially of rare earth doped crystals, rare earth doped glasses, undoped crystals and fluorescent mediums suspended in plastic;
   means for detecting the fluorescent radiation, the detecting means including means for converting the optical signal corresponding to the power of detected fluorescent emission radiation to an electrical signal, said detecting means further comprising:
   a plurality of optical fibers,
   a first end of each of said optical fibers being adjacent said converting means; and
   a second end of each of said optical fibers being connected to the optical signal converting means; and
   means operatively connected with said detecting means to translate the electrical signal to indicate the power or energy of the UV radiation.

5. The ultraviolet radiometer of claim 4 wherein said rare earths are selected from the group consisting essentially of Ce, La, Eu, and Nd.

6. The ultraviolet radiometer of claim 5 wherein said rare earth doped crystal is $Ce^{3+}$:YAG.

7. The ultraviolet radiometer of claim 4 wherein said detecting means is disposed behind the converting means, opposite from the side on which the UV radiation is incident.

8. The ultraviolet radiometer of claim 4 wherein said detecting means is disposed adjacent the edge surface of the converting means for detecting fluorescent radiation being piped and emitted through said edge surface.

9. The ultraviolet radiometer of claim 4 wherein the first end of said optical fibers is adjacent the edge surface of said converting means.

10. The ultraviolet radiometer of claim 9 further including an optical attenuator means disposed between said optical fibers and said detecting means for increasing the dynamic range of the signal passing through the optical fibers.

11. The ultraviolet radiometer of claim 4 wherein the first end of said optical fibers is adjacent the rear surface of said converting means, opposite from the surface on which the UV radiation is incident.

12. The ultraviolet radiometer of claim 11 further including an optical attenuator means disposed between said optical fibers and said detecting means for increasing the dynamic range of the signal passing through the optical fibers.

13. The ultraviolet radiometer of claim 4 wherein said fluorescent plate is substantially transparent to UV radiation.

14. An ultraviolet radiometer, comprising:
   means for converting incident UV radiation to fluorescent radiation, said UV radiation converting means being a plate constructed of fluorescent optically transparent material selected from the group consisting essentially of rare earth doped crystals, rare earth doped glasses, undoped crystals and fluorescent mediums suspended in plastic;
   means for detecting the fluorescent radiation, the detecting means including means for converting the optical signal corresponding to the power of detected fluorescent emission radiation to an electrical signal;
   means operatively connected with said detecting means to translate the electrical signal to indicate the power or energy of the UV radiation; and
   reflector means disposed adjacent said plate for reflecting UV radiation initially transmitted through said plate back onto said plate.

15. The ultraviolet radiometer of claim 14 including heat sink means bonded to said reflector means for absorbing heat generated by UV radiation being transmitted through said reflector means.

16. An ultraviolet radiometer, comprising:
means for converting incident UV radiation to fluorescent radiation, said UV radiation converting means being a plate constructed of fluorescent optically transparent material selected from the group consisting essentially of rare earth doped crystals, rare earth doped glasses, undoped crystals and fluorescent mediums suspended in plastic;
means for detecting the flourescent radiation, the detecting means including means for converting the optical signal corresponding to the power of detected fluorescent emission radiation to an electrical signal;
means operatively connected with said detecting means to translate the electrical signal to indicate the power or energy of the UV radiation; and
heat sink means bonded to the surface of said plate, opposite from which the UV radiation is incident, for absorbing heat generated in the plate.

17. An ultraviolet radiometer, comprising:
means for converting incident UV radiation to fluorescent radiation, said UV radiation converting means being a plate constructed of fluorescent optically transparent material selected from the group consisting essentially of rare earth doped crystals, rare earth doped glasses, undoped crystals and fluorescent mediums suspended in plastic; the converting means further comprising:
a polished or coated edge with means to reflect fluorescent radiation back into the plate; and
a gap means in the polished or coated edge to enable fluorescent radiation to escape from the plate for detection by the detecting means;
means for detecting the fluorescent radiation, the detecting means including means for converting the optical signal corresponding to the power of detected fluorescent emission radiation to an electrical signal; and
means operatively connected with said detecting means to translate the electrical signal to indicate the power or energy of the UV radiation.

18. The method of measuring the intensity of ultraviolet radiation, comprising the steps of:
providing a source of UV radiation;
converting the UV radiation into fluorescent radiation linearly proportional to the UV radiation by directing the UV radiation onto an undoped crystal of sapphire so as to emit the fluorescent radiation;
detecting the fluorescent radiation;
converting the optical signal corresponding to the detected fluorescent radiation to an electrical signal; and
converting the electrical signal to a value indicating the power of the UV radiation.

19. The method of claim 18 further including the step of converting the electrical signal to a value indicating the energy of the UV radiation.

20. The method of claim 19 including the steps of:
converting the UV radiation into fluorescent radiation with a plate constructed of fluorescent material optically transparent to fluorescent wavelengths; and
detecting fluorescent radiation emanating from the edges of the plate.

21. An ultraviolet radiometer, comprising:
means for converting incident UV radiation to fluorescent radiation, said UV radiation converting means being a plate constructed of fluorescent optically transparent material, said transparent material being an undoped crystal;
means for detecting the fluorescent radiation, the detecting means including means for converting the optical signal corresponding to the power of detected fluorescent emission radiation to an electrical signal; and
means operatively connected with said detecting means translate the electrical signal to indicate the power or energy to the UV radiation.

22. An ultraviolet radiometer, comprising:
means for converting incident UV radiation to fluorescent radiation, said UV radiation converting means being a plate constructed of fluorescent optically transparent material, said transparent material being a fluorescent medium suspended in plastic;
means for detecting the fluorescent radiation, the detecting means including means for converting the optical signal corresponding to the power of detected fluorescent emission radiation to an electrical signal; and
means operatively connected with said detecting means translate the electrical signal to indicate the power or energy of the UV radiation.

* * * * *